United States Patent Office 3,215,060
Patented Nov. 2, 1965

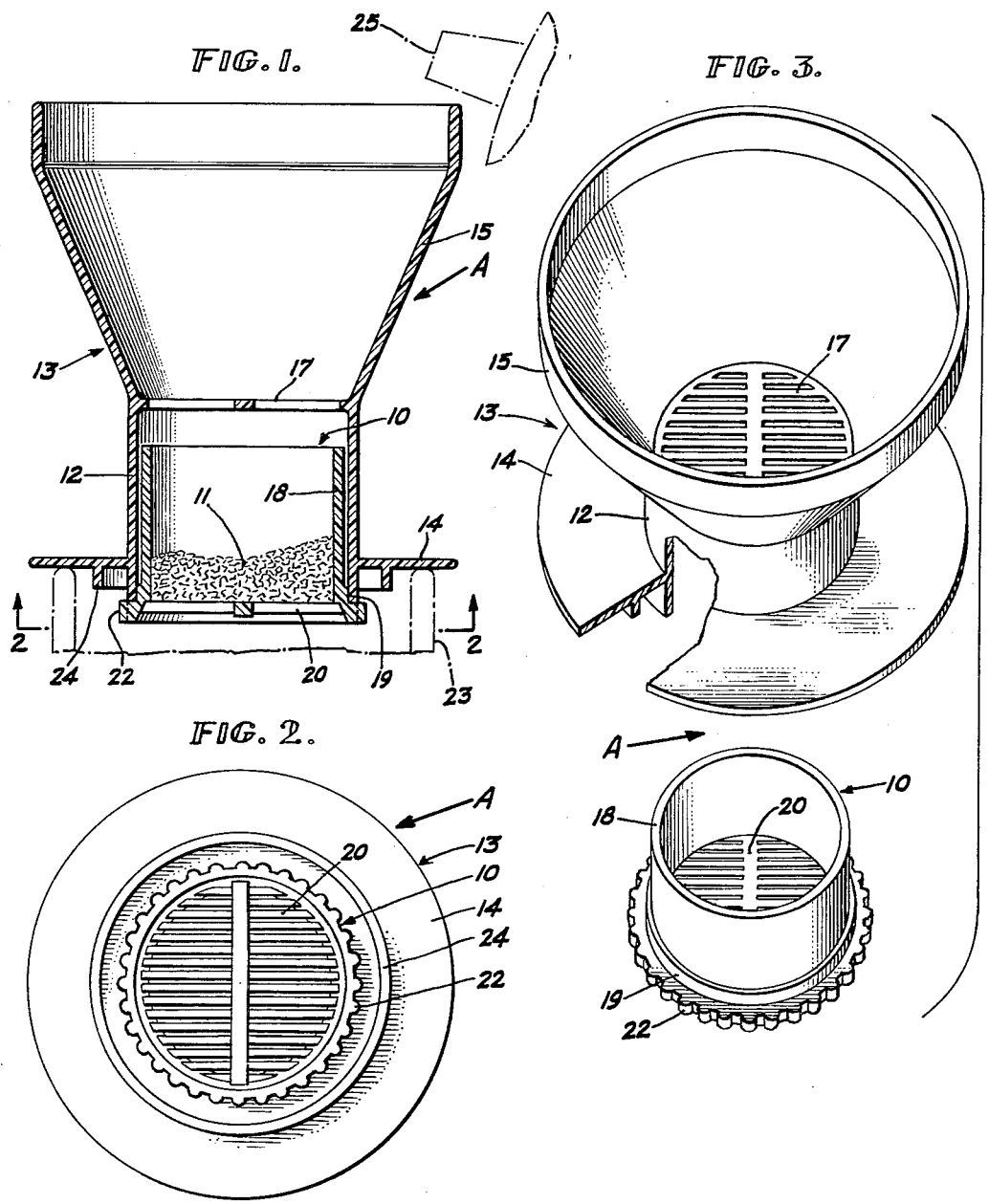

3,215,060
ONE CUP COFFEE MAKER
Raymond Perlov, Box 275, Los Altos, Calif.
Filed Jan. 6, 1964, Ser. No. 335,833
1 Claim. (Cl. 99—306)

The present invention relates to a coffee maker, and pertains more particularly to a drip type, one cup coffee maker.

In the past, numerous types of drip type coffee makers have been developed, and some of these prior developments have been particularly adapted for brewing a single cup of coffee. Many of the latter however are rather difficult and expensive to manufacture, and require that the charge of coffee be inserted in a cavity or receptacle at the bottom of the water reservoir, which makes it difficult to judge the amount of coffee therein, and also presents cleaning problems.

The present invention provides an improved and simplified one cup coffee maker.

A further object of the invention is to provide a one cup coffee maker wherein a cup-shaped receptacle of a size to receive a charge of finely ground coffee, and having a finely perforated bottom, fits freely upwardly into a cylindrical socket provided therefor in the lower end of a combined, and unitary, water reservoir and support flange, frictional engagement being provided between the coffee receptacle and the socket at a point closely adjacent the limit of insertion of the receptacle within the socket.

These and other objects and advantages of the invention will be apparent from the following description and the accompanying drawings, wherein:

FIG. 1 is a vertical, diametrical sectional view through a one cup coffee maker embodying the invention, the rim portion of a coffee cup and the pouring spout of a tea kettle being indicated in dot-dash lines.

FIG. 2 is a bottom elevational view of the coffee maker shown in FIG. 1.

FIG. 3 is an exploded, perspective view of the coffee maker shown in FIGS. 1 and 2, the cup-shaped coffee receptacle being shown removed axially downwardly from the socket into which its seats, a portion being broken away.

Briefly, the invention comprises a two part coffee maker A having a cup-shaped coffee receptacle 10 of a size to hold a charge 11 of finely ground coffee sufficient to brew a cup of coffee of the maximum desired strength. This receptacle 10 fits freely within the cylindrical socket portion 12 of a unitary member 13 which comprises, in addition to the socket portion 12, an annular, support flange 14, a water reservoir 15, and a grid 17 which allows boiling water, poured into the reservoir 15, to drip down onto the charge 11 of coffee in the receptacle 10.

Referring to the drawings in greater detail, the cup shaped coffee receptacle 10 comprises a cylindrical wall portion 18 of a diameter sufficiently smaller than the internal diameter of the socket portion 12 to fit freely therein, an annular bead 19 being provided around the lower end of the receptacle wall 18 of a diameter to have a close press fit within the lower end of the socket portion 12. This arrangement provides sufficient frictional engagement of the receptacle with the socket portion 12 to prevent dislodgement of the receptacle during a coffee making operation.

All parts of both the receptacle 10 and the unitary member 13 preferably are made of hard, shatterproof, tasteless molded plastic material having a low co-efficient of thermal expansion of a type commonly employed for making cups, saucers and other dishes for table use. Several suitable plastic substances of this nature are well known, and new ones are constantly being developed, so it will be unnecessary to specify herein any particular plastic substance for this purpose.

There is no danger of the socket portion 12 expanding away from the receptacle 10 during normal use, and thus accidently permitting the latter to drop into a cup during a coffee brewing operation, since the receptacle wall 18 is exposed to the heat of boiling water dripping through the grid 17 to a greater degree than the socket portion 12, particularly the lower end of the socket portion which is sealed off from contact with the water by frictional engagement between the bead 19 and the socket portion. Thus, during the initial coffee brewing period, the receptacle 10 tends to expand at a rate slightly greater than the socket portion 12 so as to actually increase frictional engagement between these two members. However, a short time after a charge of boiling water has been poured into the reservoir 15, and well before the time when it is desirable to remove the receptacle 10 from the socket portion 12, the temperature of these parts will have substantially equalized.

The bottom 20 of the receptacle 10 is provided with a plurality of small perforations, as is the practice with drip type coffee makers, so that water poured thereon will drip slowly therethrough to provide the necessary brewing action. In the illustrated form of the invention, the receptacle bottom 20 comprises a fine grid molded integrally with the receptacle 10, and the openings in which provides the drip apertures.

A radially extending rim 22 is provided around the lower end of the receptacle 10, and the periphery of this rim is knurled or denticulated as illustrated to permit it to be grasped easily for withdrawing the receptacle 10 after use, or for inserting the latter in the socket portion 12. This rim 22 bears against the lower end of the socket portion 12 when the receptacle 10 is fully inserted therein, and the lower end of the socket portion extends downwardly below the supporting flange 14 a sufficient distance to permit easy grasping of this rim by a user in inserting and withdrawing the receptacle.

The annular supporting flange 14 is co-axial with the socket portion 12, and is of a diameter greater than that of the maximum size cup 23 for which the coffee maker A is intended. An inner retaining flange 24 extends downwardly, concentrically from the under side of the flange 14, to limit lateral displacement of the coffee maker A on a cup 23 upon which it is mounted.

The water dispersing grid 17 which divides the tapered upper reservoir portion 15 of the unitary member 13 from the socket portion 12 thereof is molded integrally with the member 13, and, as illustrated, is generally similar to the receptacle bottom 20. However the openings in the grid 17 are preferably larger than those of the receptacle bottom portion 20 so as to permit the water to flow downwardly into the receptacle 10 at a rate faster than it drips through the perforated receptacle bottom 20. The openings in the grid 17 preferably are sufficiently small to permit water poured into the reservoir 15 to drip through the grid 17 over the entire exposed upper surface of the coffee 11 in the receptacle.

After a desired quantity of boiling water has been poured into the reservoir 15, as from a tea kettle 25, the brewing of the coffee proceeds in the usual manner for drip type coffee makers, and when such water has passed through the coffee 11 and out through the perforated receptacle bottom 20, the coffee maker A is removed from the cup. The knurled lower rim 22 of the receptacle 10 may then be manually grasped by a user, and the receptacle 10 withdrawn from its socket 12. The spent coffee grounds are then dumped out, and the receptacle 10 is rinsed off to clean it for the next use. A very slight rinsing of the unitary member 13 also is advisable, although none of the strong brew ever contacts this part of the mechanism.

If a hostess wishes to prepare several cups of coffee simultaneously for several guests, and has numerous dishes in the kitchen and but little space available in which to work, a desired number of the coffee receptacles 10 may be charged with a desired quantity of coffee and placed aside ready for use, while the relatively large, unitary, flanged, socket-grid-reservoir members 13 may be left in the cupboard until it is time to serve the coffee. The receptacles 10 may then be quickly and easily snapped into their respective sockets 12 and one of the coffee makers A placed upon each of several cups, ready for filling with boiling water.

The invention comprises a simple, inexpensive and highly satisfactory one-cup coffee maker, which is simple and easy to use and to clean, and which, due to the inherent long and narrow shape of the reservoir 15 and receptacle 10 provides a maximum head of coffee with a minimum exposed surface for cooling.

While I have illustrated and described a preferred embodiment of the present invention, it will be understood, however, that various changes and modifications may be made in the details thereof without departing from the scope of the invention as set forth in the appended claim.

Having thus described the invention, what I claim as new and desire to protect by Letters Patent is defined in the following claim.

A one cup coffee maker comprising:
(a) a cup-shaped coffee receptacle having a bottom with a plurality of fine perforations therein, the receptacle being of a size to receive a charge of finely ground coffee sufficient to make one cup of brewed coffee of maximum desired strength,
(b) a unitary member comprising a downwardly opening cylindrical socket portion on the lower end thereof of a diameter to receive the coffee receptacle freely in upright position therein, and of a height to receive the receptacle in fully inserted condition telescopically therein,
(c) an annular support flange portion co-axial with, and closely adjacent the lower end of the socket portion, whereby a major part of the socket portion is above the flange, the latter being of a diameter greater than that of the maximum size cup upon which the coffee maker is to be supported,
(d) an inverted, truncated, frusto-conical reservoir portion tapering upwardly and outwardly from the upper end of the socket portion, the reservoir portion being deeper than its mean diameter, and of a size to hold a quantity of water sufficient to fill a cup of maximum desired size,
(e) a perforate wall extending transversely of the upper end of the socket portion and separating the socket portion from the reservoir portion,
(f) means for releasably interengaging the coffee receptacle in substantially fully inserted condition within the socket portion, and
(g) a rim projection radially from the lower end of the receptacle and beyond the socket portion when the receptacle is inserted fully therein to limit insertion of the receptacle in the socket and to provide means in the form of the projecting rim for gripping the receptacle for manually insertion in and withdrawal of the receptacle from the socket.

References Cited by the Examiner

UNITED STATES PATENTS

| | | | |
|---|---|---|---|
| 1,412,388 | 4/22 | Clermont | 99—77.1 X |
| 2,567,183 | 9/51 | Collins | 220—42 X |
| 3,118,562 | 1/64 | Whitney | 150—0.5 |

FOREIGN PATENTS

| | | |
|---|---|---|
| 1,057,760 | 5/59 | Germany. |
| 9,943 | 4/14 | Great Britain. |
| 598,677 | 10/59 | Italy. |

WALTER A. SCHEEL, *Primary Examiner.*

JEROME SCHNALL, ROBERT E. PULFREY,
*Examiners.*